Sept. 25, 1956  W. C. PORTER ET AL  2,764,695
GEIGER-MULLER COUNTER CIRCUITS
Filed Aug. 14, 1953  2 Sheets-Sheet 1

INVENTORS.
WILLIAM C. PORTER
WILLIS E. RAMSEY
BY
ATTORNEYS

Sept. 25, 1956 W. C. PORTER ET AL 2,764,695
GEIGER-MULLER COUNTER CIRCUITS
Filed Aug. 14, 1953 2 Sheets-Sheet 2

THREEFOLD COINCIDENCES
Vs.
OVERVOLTAGE OF COUNTER "B"
"B" COUNTING RATE = 20 CPS
PULSE HEIGHTS WITHIN 10% OF EQUALIZATION
AT ZERO OVERVOLTS

INVENTORS.
WILLIAM C. PORTER
WILLIS E. RAMSEY
BY
D. C. Snyder
Roderick B. Jones
ATTORNEYS

United States Patent Office 2,764,695
Patented Sept. 25, 1956

2,764,695

GEIGER-MÜLLER COUNTER CIRCUITS

William C. Porter, Collingdale, and Willis E. Ramsey, Upper Darby, Pa., assignors, by mesne assignments, to the United States of America as represented by the Secretary of the Navy Application August 14, 1953, Serial No. 382,878

5 Claims. (Cl. 250—83.6)

This invention relates to improvements in Geiger-Müller (G-M) counters, and more particularly pertains to G-M counter circuits providing a substantial reduction in counter deadtime.

According to the discharge mechanism of G-M counters, active discharge of the tube occurs in about $10^{-6}$ sec. In many counters, the total transit time of the positive-ion sheath to the cathode is of the order of several hundred microseconds. In general, the voltage pulse initiated by a discharge is characterized by a rapid negative potential change during the period of electron collection, followed by a relatively slow negative continuation induced by the migration of positive ions toward the cathode.

Usually, the RC time constant of the external circuit is small compared to the positive-ion collection time. Thus, the central wire reaches a peak negative potential and returns almost to its quiescent voltage long before the ion collection is complete. However, a new discharge does not occur until the positive-ion sheath, which dominates the field around the wire, has migrated enough to allow the field to reach the G-M threshold level.

A new discharge which occurs after the insensitive interval, but before the ions are completely collected, is smaller in amplitude than one produced when the counter is in its quiescent state because of the reduced field between the wire and the uncollected sheath.

As used conventionally, the discharge in a G-M counter spreads, from one or more points, over the entire length of the counter wire. Subsequently, the counter tube remains unresponsive to radiation until such time as the positive ion sheath, in its motion toward the cathode, permits a restoration of the starting field. This deadtime, which frequently is as long as one hundred microseconds, limits very seriously all applications wherein a counter must be used at high repetition rates. The deadtime is particularly serious in coincidence operation where the large collecting surface of long counters is required but an intense background field is unavoidable. Numerous investigators have contributed means to reduce this limitation, illustrative work being reported in the following publications:

(1) J. A. Simpson, Jr.: "Reduction of the Natural Insensitive Time in G-M Counters," Phys. Rev., vol. 66, p. 39 (1944).
(2) A. L. Hodson: "Reduction of 'Insensitive Time' in Geiger-Müller Counters," J. Sci. Inst., vol. 25, p. 11 (1948).
(3) P. B. Smith: "Dead-Time Reduction in Self-Quenching Counters," Rev. Sci. Inst., vol. 19, p. 453 (1948).
(4) B. Collinge: "Dead-Times of Self-Quenching Counters," Proc. Phys. Soc. London, vol. 63B, p. 15 (1950).
(5) H. den Hartog and F. A. Muller, "Dead-Time Theory and Technique," Physica, vol. XVI, p. 17 (1950).

However, the reduction of deadtime continued to be a serious problem.

The subject device increases greatly the rate at which a counter can be operated without loss and achieves an equally great increase in tube life, both of such increases being proportional directly to tube length. That is, for a given percentage loss, a 40 cm. counter can be operated at forty times its usual rate, while a factor of twenty is possible with a 20 cm. tube. This result is accomplished by working within a relatively narrow overvoltage with respect to the potential characterized by pulse equalization and by minimizing stray capacitances.

Accordingly, the principle object of this invention is to provide means to reduce materially the deadtime of a G-M counter.

Another object is to provide simple and compact means to reduce counter deadtime while avoiding geometrical complications associated generally with the use of a number of tubes in coincidence.

A further object is to provide a cutoff circuit to reduce counter deadtime, such circuit being adapted for use with a range of counter types and sizes.

Still another object is to provide a cutoff circuit of the character described affording a marked increase of counter life with but slight loss in efficiency wherein simplicity as compared to a multiple tube circuit is gained with ordinate decrease in allowable overvoltages.

Other objects and many of the attendant advantages of this invention will be readily appreciated as the same becomes better understood by reference to the following detailed description when considered in connection with the accompanying drawings wherein.

Similar numerals refer to similar parts throughout the several views.

Figure 1:
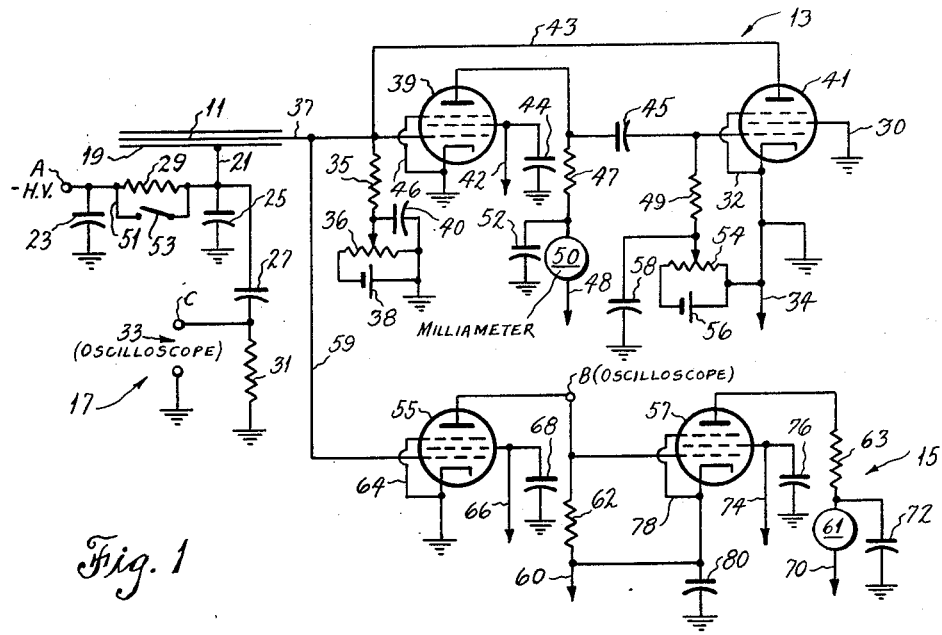
Fig. 1 is a circuit diagram of a G-M counter circuit having cut-off, rate-measuring and viewing subsidiaries, showing a preferred embodiment of the invention.

As shown in Fig. 1, the wire 11 of the counter is coupled directly to the cut-off circuit 13, with the rate-measuring circuit 15 in parallel with the cut-off circuit and the viewing circuit 17 coupled directly to the cylinder 19 of the counter, the subsidiary circuit serving the purpose of facilitating the study of the cut-off circuit.

The high potential is applied to the cylinder 19 of the counter at the point A to permit operation of the cut-off circuit 13 at normal voltage levels. The conductor 21 couples cylinder 19 and the series-parallel network of by-pass condensers 23, 25 and 27 and resistors 29 and 31, with the oscilloscope 33 in parallel with condensers 23 and 25 and resistor 31, as shown. Grounding of the circuits is illustrated in the conventional manner.

Variable bias of resistor 35 is provided through battery 38 in parallel with variable resistance 36, with condenser 40 affording a bypass to ground. The screen grid voltage of tube 39 is applied through conductor 42, which is paralleled by condenser 44 providing a by-pass to ground, and the suppressor grid of tube 39 is grounded to the cathode through conductor 46. Plate voltage for tube 39 is delivered from conductor 48 through milliammeter 50 and resistor 47, hereinafter described, with condenser 52 connected between resistor 47 and meter 50 to provide a bypass to ground.

The screen and suppressor grids of tube 41 are grounded through conductors 30 and 32 respectively and high negative voltage of the cathode of tube 41 maintained through conductor 34. The parallel network of variable resistor 54 and battery 56 couples resistor 49 and conductor 34, and condenser 58 affords a bypass to ground from the junction of said network and resistor 49.

When an ionizing particle passes through the counter, it starts the normal spreading process down the wire 11 from which process is obtained the electron component necessary to actuate the circuit. When the voltage pulse appearing across resistor 35, which is coupled to wire 11 through conductor 37, is approximately 0.2 volt, such pulse is amplified enough in tube 39 to cause the grid of tube 41 to come from below cut-off bias. Hence the plate current of tube 41, fed through conductor 43, adds to the voltage drop of resistor 35, providing a cumulative action that proceeds until tube 39 is cut off. The grid of tube 41 starts to recover rapidly by virtue of the short time constant determined by coupling condenser 45, coupling the plate of tube 39 and the grid of tube 41, by resistor 47 in the plate circuit of tube 39, by resistor 49 and by the input impedance of tube 41. As the grid of tube 41 recovers, the plate current of tube 41 decreases until the voltage drop across resistor 35 is less than the cut-off bias of tube 39. The resulting negative pulse on the plate of tube 39 abruptly returns the grid of tube 41 below its cut-off value. By selecting components of appropriate values, the time required for an entire cycle of the circuit operation is approximately 1.5 microseconds: after this period of time, the circuit is again ready to accept a new pulse.

In order to make the cut-off circuit 13 operate as rapidly as possible, the stray capacitance must be kept at a minimum. This requirement is accomplished preferably by mounting tubes 39 and 41 adjacent to each other and by soldering connections directly to the tube pins. Values for tubes 39 and 41 of 45 volts plate voltages, 67.5 volts screen grid voltage and —5.0 volts control grid voltage, with plate current less than 0.2 microampere, were found to be of an optimum order.

The circuit output pulses proved upon test to be uniform in shape and amplitude up to the highest rates encountered, $2\times10^5$ counts per second. However, at very high rates of counting, resistor 29 should be short-circuited through conductor 51 and switch 53 so that the potential across the counter remains constant.

Since no alteration in size or shape of the pulses was observed over the operating range of counter voltages used, from six to thirty volts above the starting potential, the pulses appearing across resistor 35 can be applied to rate-measuring circuit 15, said circuit 15 having pentodes 55 and 57, as shown in Fig. 1, the grid of tube 55 being coupled to conductor 37 by conductor 59.

In rate-measuring circuit 15, plate voltage for tube 55 is supplied from conductor 60 through resistor 62, the suppressor grid is grounded to the cathode through conductor 64 and screen grid voltage provided through conductor 66, which has bypass condenser 68 affording a path to ground. Plate voltage for tube 57 is supplied from conductor 70 through meter 61 and resistor 63, condenser 72 being connected between said meter and said resistor to provide a bypass to ground. Screen grid voltage is furnished through conductor 74, which is connected to bypass condenser 76 to provide a bypass to ground. The suppressor grid of tube 57 is coupled to the cathode through conductor 78, and said cathode and the conductor 60 are grounded through condenser 80.

The current through meter 61 in the plate circuit of tube 57 serves as a rate indicator. Obviously, at the higher rates, the fluctuations in meter 61 are quite small, so resistor 63 is placed in series in the plate circuit of tube 57 so that the plate pulse of tube 57 can trigger a scaler directly for calibrating purposes.

The deadtime can be measured by triggering an oscilloscope sweep by a counter pulse, delaying the pulse so that it can be seen at a fixed position near the beginning of the sweep, and observing any other pulses that occur in the interval of the time base. A triggered oscilloscope connected at point B (see Fig. 1) can be used for such presentations, with photons used to initiate the pulses.

In the case of normal counter discharge, no pulses appear until after approximately 45 microseconds have elapsed since the beginning of the triggering pulse. After this time, the pulse height is dependent upon the time since the triggering pulse has occurred. The manner of build-up of pulse sizes in this region can be correlated to the motion of the positive ion sheath in the counter after the discharge. Although the potential of the wire is returned to normal in a short time, the electric field is still being controlled partially by the ion sheath.

In the case of counter discharge with cut-off circuit 13 operating, no pulses can be observed in the first 1.5 microsecond interval. After this time, pulses appear, and any pulse appearing on the time base is identical in size and shape with the pulse that triggered the sweep. Since the cut-off circuit limits the spreading to a short segment of the counter length, positive ions are present only in the vicinity of this discharged region. When the circuit returns the potential of the counter to its normal value, the electric field near the wire is returned to normal also, except for the short segment used in the previous discharge.

The auxiliary viewing circuit 17 connected to the counter cathode or cylinder 19 maintains pulses at point C proportional to the number of positive ions evolved in the counter discharge. The ratio of the pulse heights observed at C with and without the cut-off circuit 13 in operation indicates that the circuit 13 limits the spreading of the discharge to $\frac{1}{20}$ of the length of the counter, or approximately 1 centimeter. If two centers separated by more than 1 centimeter are formed by an ionizing particle, a pulse larger than a single center pulse can be produced. Where $\beta$ rays are sent in through a side window in the counter, scattered $\beta$ rays produced some of these multiple centers. The effect of more starting centers or multiple centers appears more clearly where the $\beta$ rays are admitted through an end window.

Figure 2:
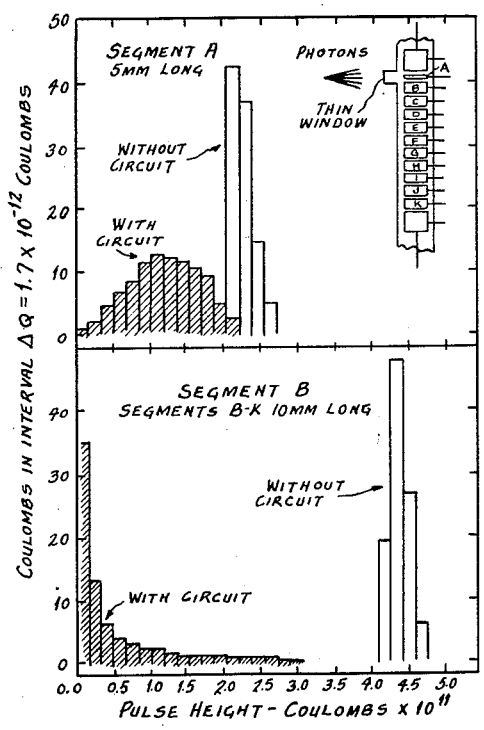
Fig. 2 is a graph plotting pulse height distributions from cathode segments along the counter length and showing the effect of the cut-off circuit.

To confirm the assumption that the spreading process was limited to approximately 1 cm. of length, a special counter with the cathode split into a number of individual cylindrical segments, shown schematically in the upper right-hand corner of the graphs of Fig. 2, was used. Opposite to segment A was a thin window that admitted photons, so that a single-centered discharge, and hence the spreading, always started in the region of segment A. The distribution of pulse heights was then measured on different segments with and without the cut-off circuit 13. The results are plotted in Fig. 2. Without the circuit 13, the pulses appearing on segment B are about twice as large as those on segment A, as shown by the plain block pulse height distribution. (This is to be expected from the relative lengths, 10 mm. and 5 mm. respectively, of the two segments.) Segments C through K had distribution curves, without the circuit 13 operating, similar to that shown for segment B.

With the circuit 13 in operation, the pulse-height distributions on all segments of the counter are changed markedly. While the counting rate of segment A remained unchanged, that of segment B was reduced by approximately 25 per cent and that of segment C by more than 99 per cent of the "no circuit" rate. This proves that the circuit limits the spreading to not more than 1 cm. from the point of origin of the discharge.

The rather broad pulse-height distribution observed on segments A and B is believed to result mainly from poor collimation of the photon beam rather than statistical fluctuations in the spreading process or in the cut-off time of the circuit. Comparison of the shaded pulse-height distributions observed on segments A and B indicates that the average charge developed along the length of segment B is much less than in A with the circuit 13 in operation.

If N' is the number of impulses that should be counted per unit time and N is the number actually counted per unit time, the relation between N and N' is $$N=\frac{N'}{1+N'\sigma} \quad (1)$$

where $\sigma$ is the deadtime. This formula assumes that the counter and associated circuit are completely incapable of registering a count during a time interval following each count, and that full efficiency is restored abruptly at the end of the interval $\sigma$.

In order to obtain equally spaced values of N', five radioactive sources, L, M, O, P and Q were used. First, positions were found for these sources in which each individually gave the same value for N, to assure that the use of L, followed by the use of L plus M, followed by the use of L plus M plus O, etc. provides successively equal increments of N'. Setting $N'=\alpha n$ where $n$ is the number of sources irradiating the counter, then $$N=\frac{N'}{1+N'\sigma}=\frac{\alpha n}{1+\alpha n\sigma} \quad (2)$$

With source L alone in position, it was found that $N=10^4$ cps. Hence $$10^4=\frac{\alpha}{1+\alpha\sigma} \quad (3)$$

$$\alpha=\frac{1}{10^{-4}-\sigma} \quad (4)$$

(Note that $10^{-4}$ second is the greatest value for $\sigma$ consistent with the measurement of $10^4$ counts per second.) Substituting in Equation 2, this yields $$N=\frac{\frac{1}{(10^{-4}-\sigma)}n}{1+\frac{\sigma}{(10^{-4}-\sigma)}n}=\frac{n}{\sigma(n-1)+10^{-4}} \quad (5)$$

Figure 3:
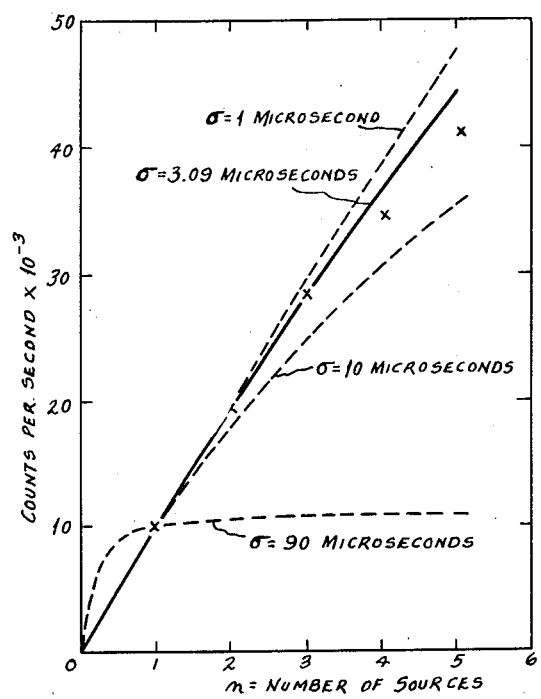
Fig. 3 is a graph plotting the counting rate for counters of various deadtimes as a function of source strength.

With the values $\sigma=1$, 10 and 90 μsec. substituted, the set of dashed curves shown in Fig. 3 is obtained. (A unit of source strength is defined as the strength required to give $10^4$ counts per second, or $$\alpha=\frac{1}{10^{-4}-\sigma}$$

The X's are experimental points obtained with cut-off circuit 13 operating.) As the theoretical curves are plotted in Fig. 3, it might appear that at low source intensities the counter would count faster with a 90 μsec. deadtime than with a 1 μsec. deadtime. This apparent absurdity arises from the fact that the method used to normalize the theoretical curves to the experimental data yields a different value of $\alpha$ for each dashed curve. The solid curve, which fits the experimental data for $n=1$, 2 and 3 within the statistical errors, is obtained by setting $\sigma=3.09$ μsec. The agreement of the solid curve with the experimental data is as good as might be expected in view of the limited extent to which Equation 2 is applicable to the experimental conditions. The value of $\sigma$ calculated from the experimental observations is too large, because the first source was very near to the counter, saturating that portion immediately adjacent to it and decreasing the effective length of the counter for counting the radiations from the remaining sources that were placed at successively greater distances.

Figure 4:
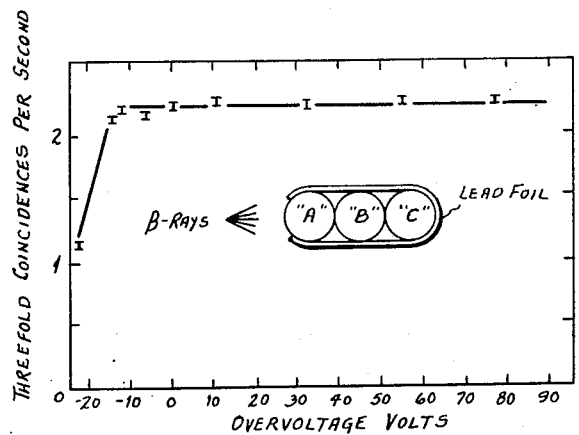
Fig. 4 is a graph plotting the relative efficiency of counters against overvoltage.

In view of the general belief that the efficiency of G-M counters is low near the starting voltage, in view of the ambiguities associated with the definition of starting voltage in self-quenching mixtures, and because experiments were performed at relatively low overvoltages, the relative efficiency of the counter as a function of overvoltage was measured in a triple coincidence arrangement, shown schematically in Fig. 4. The results plotted in Fig. 4 indicate no loss of efficiency at the relatively low overvoltages employed.

To establish the generality of the cut-off circuit employed, counters varying in length from 8 to 40 cm. and in diameter from 0.9 cm. to 3 cm., all equipped with central wires 0.003 in. in diameter; cylinders of copper 0.005 in. thick or Aquadag painted internally on glass walls 0.006 in. thick; thin windows to transmit light where single centered discharges were essential; and gas mixtures of argon-ether (6.5:1) at 5.5 cm. Hg pressure or argon-butane (6:1) at 8.5 cm. and 12 cm. Hg pressure or argon-alcohol (4:1) at 8.0 cm. Hg pressure were employed. The circuit operated effectively with all of the above counters.

It is apparent that the subject device achieves the objects hereinabove set forth. The two tube feed-back circuit 13, triggered about $10^{-8}$ second after the initiation of the discharge, interrupts the spreading process in a few hundredths of a microsecond by field reduction at the wire. The control circuit recovers, restoring normal operating field conditions except over a small segment near the point where the discharge started. Thus in about a microsecond most of the counter is resensitized, resulting in a very short deadtime. The voltage pulse on the wire, although triggered by the initial counter current, has a shape determined predominately by the parameters of the cut-off circuit, and hence all pulses are equalized.

Since the circuit limits the spreading of discharge, the number of ion pairs formed in a discharge is decreased, thereby increasing greatly the life of the counter. Life is further increased, for a similar reason, by operating at low overvoltages. Since the velocity of propagation of discharge along the counter wire increases with overvoltage, a faster operating circuit capable of giving a larger reduction of field at the wire of the counter would be required if higher overvoltages are desired. However, efficiency measurements indicate that little is to be gained at higher overvoltage.

Obviously many modifications and variations of the present invention are possible in the light of the above teachings. For example, simple additional circuitry would make the counter a directional radiation detector, or permit its use for discriminating between various types of radiation. It is therefore to be understood that within the scope of the appended claims the invention may be practiced otherwise than as specifically described.

We claim:

1. In a Geiger-Müller counter circuit, discharge limiting means comprising a vacuum tube amplifier coupled to the output of such circuit and regenerative feedback means coupling the output of said vacuum tube and the output of such circuit.

2. In a Geiger-Müller counter circuit, discharge limiting means comprising a first vacuum tube amplifier coupled to the output of such circuit and regenerative feedback means comprising a second vacuum tube biased normally below cut-off and driven by said first tube, and means coupling said second tube and the input of said first tube whereby said first tube is cut-off.

3. The combination defined in claim 2 wherein the means coupling said first tube and said feedback means comprises elements affording a short time constant.

4. In a Geiger-Müller counter circuit, discharge limiting means comprising a first vacuum tube amplifier coupled to the output of such circuit, regenerative feedback means comprising a second vacuum tube biased normally below cut-off and driven positive by said first tube, means providing a short time constant coupling the output of said first tube and the input of said second tube, means coupling said second tube and the input of said first tube whereby said first tube is cut-off, and means to discharge stray capacitances introduced during such operation.

5. In a Geiger-Müller counter circuit having an operating potential characterized by pulse equalization, discharge limiting means comprising a first vacuum tube amplifier coupled to the output of such circuit and regenerative feedback means comprising a second vacuum tube biased normally below cut-off and driven by said first tube to cut-off, and means coupling the output of second tube and the input of said first tube whereby said first tube is cut-off, said discharge limiting means operating proximate such potential.

References Cited in the file of this patent

UNITED STATES PATENTS

| 2,615,063 | Brown | Oct. 21, 1952 |
| 2,617,946 | Weller | Nov. 11, 1952 |